United States Patent [19]

Whiting

[11] 4,379,479
[45] Apr. 12, 1983

[54] ROLLER ASSEMBLY

[75] Inventor: Lauren C. Whiting, Clarence, N.Y.

[73] Assignee: Whiting Roll-Up Door Mfg. Corp., Akron, N.Y.

[21] Appl. No.: 384,026

[22] Filed: Jun. 1, 1982

[51] Int. Cl.³ .............................................. E06B 3/38
[52] U.S. Cl. .................................... 160/201; 160/235
[58] Field of Search ...................... 160/201, 209, 235; 16/91, 106, 107

[56] References Cited

U.S. PATENT DOCUMENTS 1,775,909  9/1930  Mikkelsen ..................... 160/201 X
3,693,693  9/1972  Court ............................ 160/201 X
4,120,072 10/1978  Hörmann ....................... 160/201 X Primary Examiner—Peter M. Caun
Assistant Examiner—Chemey S. Lieberman
Attorney, Agent, or Firm—Sommer & Sommer

[57] ABSTRACT

An improved roller assembly is provided for guiding movement of a beverage truck overhead door, and for preventing lateral misalignment of lettering or decals on the outside of such door. The improved roller assembly includes a roller, a dished washer, and a shaft. The shaft has self-tapping exteriorly-threaded shank portion, which is received in a hinge section of a door panel.

3 Claims, 4 Drawing Figures

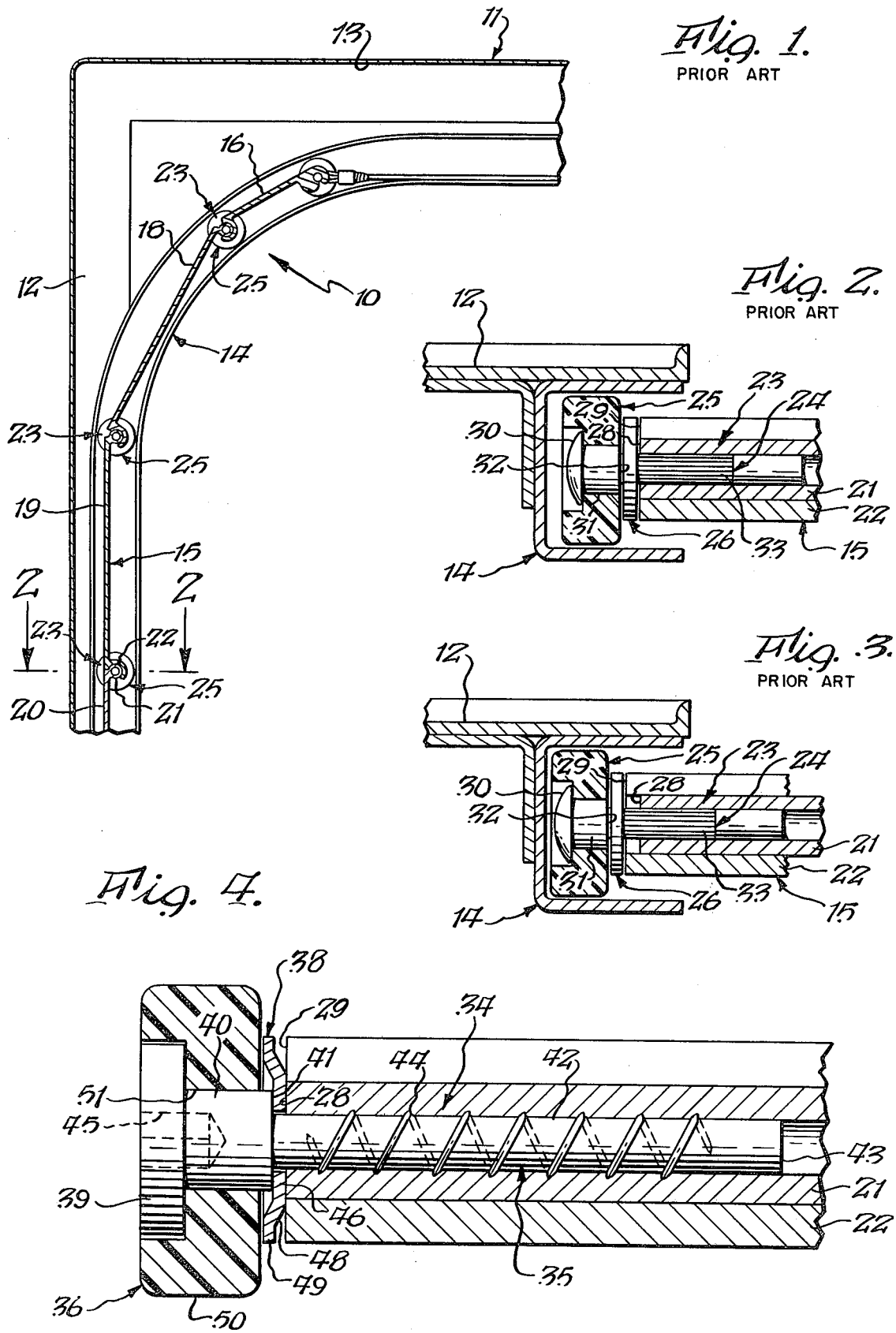

ROLLER ASSEMBLY

BACKGROUND OF THE INVENTION

1. Field of the Invention

The present invention relates generally to the field of upwardly-acting overhead doors, and more particularly to an improved roller assembly intended for use on a vehicularly-mounted door structure.

2. Description of the Prior Art

Upwardly-acting overhead door structures are commonplace. They are often found on garages and on truck bodies. Such vehicularly-mounted doors are subject to severe vibrational loading, as from road conditions and repeated starting and stopping of the vehicle. At the same time, such truck doors, particularly those on beverage trucks, are typically provided with lettering or advertising logos and decals. Applicant has observed that such lettering and decals often become misaligned because one door panel has shifted laterally relative to a vertically-adjacent door panel.

Thus, the problem faced by applicant was to provide an improved door structure for such vehicular applications, which would reduce, if not eliminate, such lettering and decal misalignment.

Unfortunately, an apparent solution to this problem was not foreshadowed by the prior art. Early attempts at a solution have included the provision of an additional interdigital hinge section to prevent lateral shifting of one panel relative to another. However, this was an item of extra cost, and required the provision of rivet heads, which themselves provided an obstacle to placement of such decals. At the same time, it has been felt desirable to extrude the door panels with integral hinge sections.

The roller members for such truck-mounted overhead doors have typically been mounted on slidable shafts which are laterally shiftable, as typically shown in U.S. Pat. No. 3,416,589.

SUMMARY OF THE INVENTION

The present invention provides a particular improvement in an upwardly-acting door structure which is arranged in a vehicle body opening. The door structure includes a track mounted on the body and includes at least two vertically-adjacent door panels. The upper panel has the lower marginal end portion configured as an elongated hinge section. The lower of these panels has its upper marginal end portion configured as a cooperative elongated hinge section. The two hinge sections are slidably interfitted together in such manner as to permit one panel to shift laterally relative to the other along the axis of hinge section elongation, while coupling the panels together for relative pivotal movement along the path of the track.

The improvement provides a roller assembly for guiding movement of the panels along the track and for reducing the ease with which one panel may shift laterally relative to another. This roller assembly broadly includes: a shaft having an exteriorly-threaded shank portion matingly received in one of the hinge sections, having a shoulder surface arranged beyond or without the hinge section in spaced facing relation thereto, and having a hub portion arranged beyond the hinge section and shoulder surface; a roller rotatably mounted on the hub and arranged in the track; and a stop member having one portion normally sandwiched between the one hinge section and the shaft shoulder surface, and having another portion arranged proximate the roller member in spaced relation thereto.

Accordingly, the general object of the present invention is to provide a mechanism by which the problem of panel shifting and lettering or decal misalignment may be solved.

Another object is to provide an improved roller assembly for use in the overhead door structure of a truck or vehicle body.

These and other objects and advantages will become apparent from the foregoing and ongoing written specification, the drawings and the appended claims.

BRIEF DESCRIPTION OF THE DRAWINGS

FIG. 1 is a fragmentary transverse vertical sectional view of a prior art beverage truck body overhead door.

FIG. 2 is an enlarged fragmentary transverse horizontal sectional view thereof, taken generally on line 2—2 of FIG. 1.

FIG. 3 is a view generally similar to the view of FIG. 2, but showing the prior art roller shaft as having been pulled out of the inner hinge section.

FIG. 4 is a further enlarged fragmentary transverse horizontal sectional view of the improved roller assembly.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the drawings, and more particularly to FIGS. 1-3 thereof, a fragmentary portion of a prior art upwardly-acting overhead door structure, generally indicated at 10, is shown as being operatively mounted on a portion of a beverage truck body 11. Such truck bodies are normally used to carry cases of bottles, such as beer, soft drinks, spring water, and the like. These truck bodies are generally rectangular in shape, and typically have five or six independently-operable upwardly-acting doors spaced horizontally from one another along both sides of the body. Thus, an operator may gain access to any particular compartment merely by opening the proximate door.

To accommodate the mounting of the doors, the body is usually provided with a plurality of horizontally-spaced vertical posts, a representative one of which is indicated at 12, which extend between the floor (not shown) and the top 13 of the body. Adjacent posts therefore define a body opening therebetween. In the well known manner, a track, generally indicated at 14, having a somewhat C-shaped transverse cross-section (FIGS. 2 and 3) is mounted on each post to face a similar track on an adjacent post. Intermediate posts may have two tracks mounted thereon, albeit facing in opposite lateral directions. Thus, each separate body opening is bounded by a pair of cooperative tracks, mounted on adjacent posts, which tracks function to both guide and restrain movement of the door.

The door itself, generally indicated at 15, is individually old in the prior art, and is formed of a plurality of vertical panels. The door in FIG. 1 is fragmentarily shown as including some four panels, namely, an uppermost panel 16, and intermediate panels 18, 19, 20, respectively. Each panel is pivotally connected to its vertically-adjacent panel(s) by means of an extruded horizontal interlocking hinge formed of two sections: an inner section 21 formed on one panel, and an outer section 22 formed on the adjacent panel. Each hinge section has a somewhat C-shaped transverse cross-section, with the outer section pivotally embracing the inner section. These hinge sections extend the full width of the door. The door structure is assembled by sliding the inner hinge section of one panel longitudinally into the outer hinge section of an adjacent panel. When so assembled, the interfitting hinge sections allow the door to articulate the path of the track, with adjacent panels pivoting relative to one another to the extent necessary. However, these extended hinge sections, which provide a convenient way by which the panels may be assembled together, is accompanied by a disadvantage in subsequent use. This problem is that vertically-adjacent panels can sometimes shift laterally relative to one another, thereby causing misalignment of lettering or advertising decals on the outside of the door.

Referring now to FIGS. 2 and 3, the prior art door 15 included a plurality of roller assemblies, generally indicated at 23, each of which had a shaft 24, a roller 25, and a washer member 26. Ideally, adjacent panels and their integral hinge sections were cut to the same width so that the edges 28, 29 of the inner and outer hinge sections would be substantially coterminus.

The shaft 24 had, from left to right in FIG. 2, a leftward head portion 30, a cylindrical hub portion 31 continuing rightwardly therefrom and terminating in a rightwardly-facing annular vertical shoulder 32, an annular notch or recess (not shown), and a longitudinally-fluted shank portion 33 continuing rightwardly to join the right end face of the shaft. During assembly, the washer 26 was slipped over the shank end of the shaft, and the subassembly thus formed was press-fitted into the open end of an inner hinge section 21. When seated, the washer 26 was sandwiched between the shaft shoulder 32 and the edges of the hinge sections.

However, such bodies were mounted on trucks and were subject to vibrations. Repeated starting and stopping would cause the doors to shift back and forth in a direction parallel to the longitudinal axes of the hinge sections. After such use, it was discovered that the press-fitted shank portion 33 would loosen and pull free of the inner hinge section. Such separation or loosening did not affect the upward operation of the door, for such overhead doors have long been provided with slidable roller shanks (see, e.g., U.S. Pat. No. 3,416,589). However, such loosening did allow the panel having the outer hinge section to shift laterally relative to the panel having the inner hinge section, as indicated in FIG. 3. Thus, lettering, advertising or decals spanning these two adjacent panels would become misaligned.

The present invention seeks to overcome this deficiency by providing an improved roller assembly, of which the presently preferred embodiment is generally indicated at 34 in FIG. 4. The improved roller assembly 34 broadly includes a shaft member 35, a roller 36, and a stop member 38.

Shaft member 34 includes, from left to right in FIG. 4, a leftward head portion 39, a cylindrical hub portion 40 extending rightwardly therefrom and terminating in a rightwardly-facing annular vertical shoulder 41, and a shank portion 42 continuing rightwardly to join shaft right end face 43. However, unlike the fluted shank portion of the prior art, the shank of the improved shaft member is exteriorly-threaded, as indicated at 44. A suitable Torx socket 45, extends axially into the head and hub portions from its left end face. Thus, the improved shaft member is adapted to be threaded into engagement with the inner hinge section.

The stop-member 38 is a dish-shaped annular washer-like element having a central planar vertical circular portion 46, an intermediate leftwardly-divergent frusto-conical transitional portion 48, and an outturned annular vertical flange portion 49.

The roller member 36 is a donut-shaped element having a peripheral tire 50, and a stepped through-bore 51 to accommodate and recess the shaft head portion. This roller member is journalled on hub portion 40 for free rotative movement thereabout.

After the roller has been positioned on the hub, the stop member 38 is then threaded over the shank portion of the shaft, such that the leftwardly-facing annular vertical surface of its central portion 46 will abut the rightwardly-facing shoulder 41 of the shaft. Thereafter, the subassembly is threaded into engagement with the inner hinge section, the threads 44 on shank portion 42 being self-tapping. The roller assembly is thus threaded into mating engagement with the inner hinge section until the stop member central portion 46 becomes compressively sandwiched between shaft shoulder 41 and the edge 28 of the inner hinge. This central portion 46 extends slightly beyond the inner hinge section so as to create an abutment to restrain lateral sliding movement of the outer hinge. In this seated condition, the stop member flange portion 49 has its left face in slightly spaced, facing relation to the annular vertical right face of the roller, and has its right face in spaced relation to the proximate edge 29 of the outer hinge section.

Of course, many modifications may be made. The particular Torx recess is exemplary only, and it is contemplated that persons skilled in this art may readily vary the means or connection by which the shaft is threaded into engagement with the hinge section. The materials of construction of the various elements are not deemed critical. Similarly, the number of threads per inch and pitch diameter provided on the shaft is considered well within the ambit of a skilled mechanic.

Therefore, while the presently preferred embodiment of the improved roller member has been shown and described, and several modifications thereof discussed, persons skilled in this art will readily appreciate that various additional changes and modifications may be made without departing from the spirit of the invention, as defined and differentiated by the following claims.

What is claimed is:

1. In an upwardly-acting door structure arranged in a body opening, said door structure including a track mounted on said body and including at least two vertically-adjacent door panels, one of said panels having its lower marginal end portion configured as an elongated hinge section, another of said panels having its upper marginal end portion configured as a cooperative elongated hinge section, said hinge sections being slidably interfitted together in such manner as to permit one panel to shift relative to the other along the axis of elongation of said hinge sections while coupling said panels together for relative pivotal movement along the path of said track, the improvement which comprises: a roller assembly for guiding movement of said panels along said track and for reducing the ease with which said panels may shift laterally relative to one another, said roller assembly including
- a shaft having an exteriorly-threaded shank portion matingly received in one of said hinge sections, and having a hub portion arranged without said one hinge section, said hub portion providing a shoulder surface arranged without said one hinge section in spaced facing relation thereto;
- a roller rotatably mounted on said hub and arranged in said track; and
- a stop member having one portion normally sandwiched between said one hinge section and said shoulder surface, and having another portion arranged proximate said roller member in spaced relation thereto.

2. The improvement as set forth in claim 1 wherein said stop member is a dish-shaped member.

3. The improvement as set forth in claim 2 wherein said dish-shaped member has a central portion contacted by said shoulder surface and one of said hinge sections, and has a flange portion arranged in spaced facing relation to said roller and to the other of said hinge sections.

* * * * *